W. N. HARING.
Means for Coupling Cars.
No. 231,565. Patented Aug. 24, 1880.
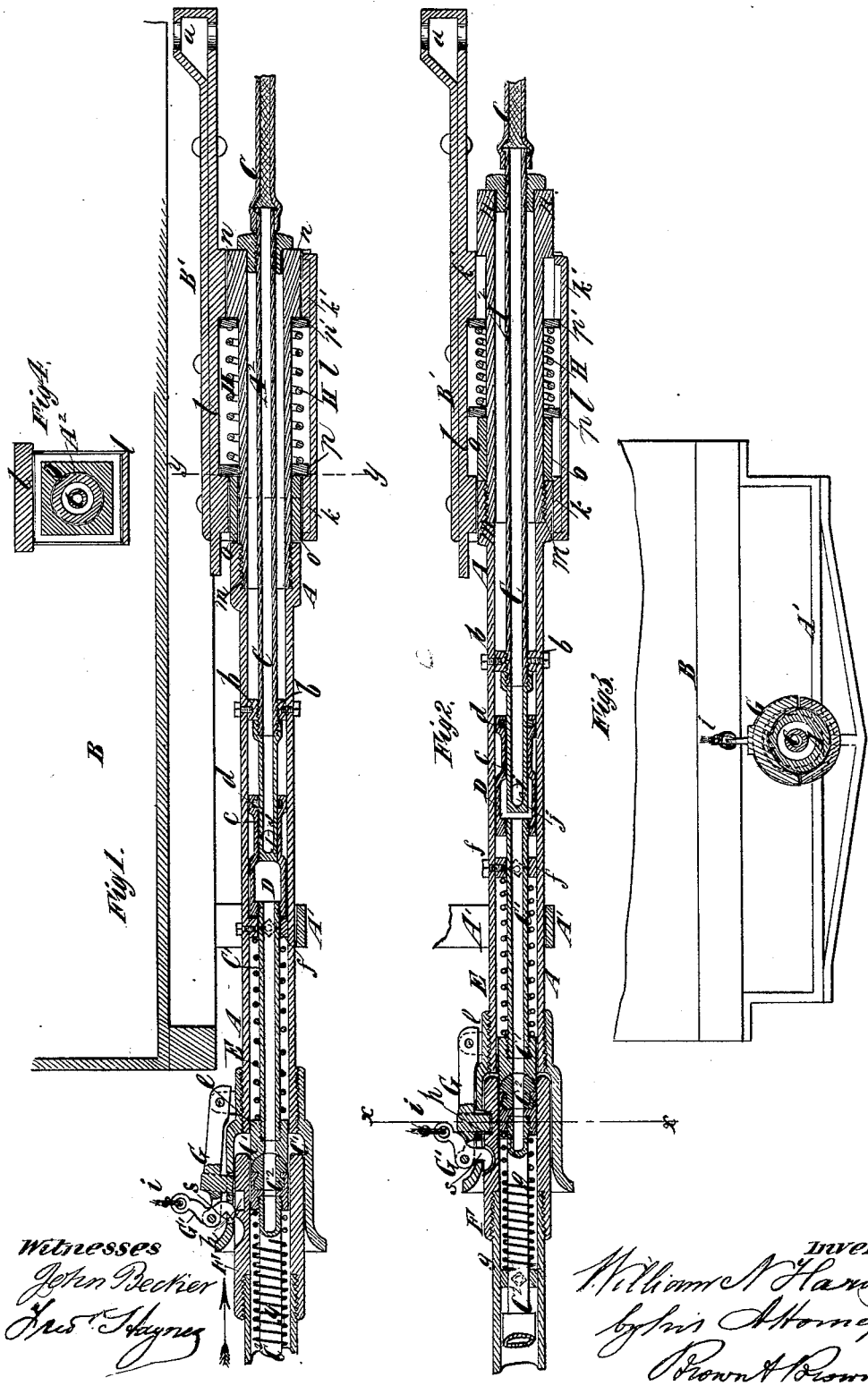

UNITED STATES PATENT OFFICE.

WILLIAM N. HARING, OF JERSEY CITY, NEW JERSEY, ASSIGNOR OF ONE-HALF OF HIS RIGHT TO JOHN C. KLATZL, OF NEW YORK, N. Y.

MEANS FOR COUPLING CARS.

SPECIFICATION forming part of Letters Patent No. 231,565, dated August 24, 1880.

Application filed February 6, 1880.

*To all whom it may concern:*

Be it known that I, WILLIAM N. HARING, of Jersey City, in the county of Hudson and State of New Jersey, have invented certain new and useful Improvements in Means for Coupling Cars, of which the following is a specification.

My invention relates to the couplings used to unite the sections of hose or pipe of vacuum or air brakes carried by the cars, and to the couplings and draw-bars which are combined with said hose or pipe couplings to connect the several cars of a train when such hose or pipes are arranged within the draw-bars, which are made hollow or open for the reception thereof.

My invention consists in the combination of two draw-bars adapted to fit one within the other, two pipes arranged concentrically within said draw-bars, and two yielding terminals for said pipes adapted to be brought in end-to-end contact in coupling, and having one a concave and the other a convex face.

My invention also consists in a valve of novel and simple construction for use in said hose or pipe, and to be opened by the inward movement of the said yielding terminal.

My invention also consists in various details of construction and combinations of parts, fully hereinafter explained, whereby a very simple and efficient coupling is produced.

In the accompanying drawings, Figure 1 represents a longitudinal section through a combined car-coupling and hose or pipe coupling embodying my invention. Fig. 2 represents a similar section of said combined coupling after the yielding terminal of the hose or pipe coupling has been moved inward by coupling with a hose or pipe section carried by an adjacent car. Fig. 3 represents a transverse section on the line $x\ x$, Fig. 2, and Fig. 4 represents a transverse section on the dotted line $y\ y$, Fig. 1.

Similar letters of reference designate corresponding parts in all the figures.

A designates a portion of a car-coupling and draw-bar, connected to the car-body B by a king-bolt which should pass through the eye $a$ at the inner end of said draw-bar, and free to swing sidewise upon a radius-bar, A', attached to the bottom of the car.

C designates the hose or pipe of a vacuum or air brake passing under the car and extending through the draw-bar A, which is made open or hollow to receive it.

As here represented, the draw-bar is made externally and internally cylindrical; but portions of the sides thereof might be removed, or a draw-bar having its middle portion formed of plates, between which the hose or pipe C is arranged, might be employed.

The hose or pipe C is held rigidly in the draw-bar against longitudinal movement—in the present instance by a collar, $b$, upon the pipe, secured by screws immovably in the draw-bar.

At the end of the hose or pipe C is a yielding terminal, C', having a telescopic connection with the end of the pipe C, and adapted to be moved inward by contact with a yielding terminal, C², carried by an adjacent car. The telescopic connection between the pipe C and the terminal C' is here represented as formed by an enlarged chamber, D, upon the inner end of the yielding terminal C', having a contracted neck portion, $c$, which fits over the pipe C, and has a suitable packing, $d$, to prevent leakage. This construction might, if desirable, be reversed and the enlarged chamber D secured to the pipe C and fit over the yielding terminal C'.

In order to insure a tight face-to-face contact between the yielding terminal C' and the terminal C², I have represented a spiral spring, E, surrounding the terminal C', and compressed as the said terminal is moved inward between the shoulder $e$ on said terminal and the collar $f$, fixed to the draw-bar, and which fits loosely upon the terminal C'.

In order to insure the concentricity of the terminals C' C², I have represented them as respectively concave and convex upon their adjacent ends.

The terminal C² fits within a draw-bar, F, carried by an adjacent car, and made to fit within the end of the draw-bar A, and the said terminal is preferably pressed outward by a spring, $g$, in a manner similar to the terminal C'.

To hold the draw-bar F in engagement with the draw-bar A, and to hold the two terminals C' C² in tight face-to-face contact, I have represented a dog, G, pivoted to the top of the draw-bar A, and fitting in a circumferential groove or notch, $h$, in the top of the draw-bar F, and extending partly around the same. The said dog has a segmental projection, which embraces nearly the semi-circumference of the draw-bar F, as clearly represented in Fig. 3, and hence has a very strong hold upon the said draw-bar F.

To prevent the dog G from being accidentally displaced or raised by the jolting of the cars, I employ a latch, G', pivoted to the said dog and engaging with a notch, $s$, in the draw-bar, as represented. A cord, $i$, or other flexible connection, is attached to the latch G', and a pull on said cord or connection will first shift the latch G', releasing it from the notch in the draw-bar, and then raise the dog.

In order to prevent leakage of air or other motive agent the hose or pipe C should be provided with a valve which is automatically closed as the yielding terminal C' moves outward, and opened as said terminal is forced inward in the act of coupling the cars. As here represented, said valve is formed by closing the end of the pipe C and making one or more holes, $j$, in the side of said pipe. As the terminal C' is moved inward in the act of coupling the enlarged chamber D is brought opposite the holes $j$, thereby permitting the free passage of air or other motive agent through the coupled sections of pipe. As said terminal is moved outward by the spring E the contracted neck $c$ of the chamber D fits over the holes $j$, and prevents the passage of air or motive agent from the hose or pipe C.

In order to prevent sudden jerks in starting and stopping cars the draw-bar A is constructed so as to yield by a pull outward and to cushion when forced inward. As here represented, this is effected in the following manner: The draw-bar A has at its inner end an attached king-bolt connection or section, B', which is provided with the eye $a$ for the king-bolt, and the said draw-bar A is capable of longitudinal movement in either direction relatively to the section B', subject to the action of a spring, H, interposed between them.

The portion B' of the draw-bar is composed of two bands or sockets, $k\ k'$, made polygonal—in this instance square—upon the inside, and connected by bars or plates $l$, extending from one to the other, and secured upon opposite sides of said bands or sockets. The rear part, $A^2$, of the section A of the draw-bar is connected to the main portion thereof by a screw-thread, $m$, so as to provide for its ready detachment. The socket in which is the screw-thread $m$ is made externally polygonal—in this instance square—to fit within the band or socket $k$, and the end $n$ of the portion $A^2$ is likewise square, and fits within the other square band or socket, $k'$. This precludes the draw-bar A from turning accidentally.

The exterior of the piece $A^2$ is round, except at the end $n$, and upon it is placed a block, $o$, having a polygonal exterior fitted to the band or socket $k$, and two polygonal washers, $p\ p'$, fitting between the bars or plates $l$, and by them precluded from turning. The spring H is placed between the washers $p\ p'$, and when a pull is exerted upon the draw-bar the washer $p$ is held stationary against the bands or sockets $k$, while the other is moved forward by the square end $n$ of the draw-bar, thereby compressing the spring H. When the draw-bar is moved inward, as in coupling, the washer $p'$ is held immovable against the band or socket $k'$, while the other washer is moved forward by the block $o$, compressing the spring H in the other direction, as shown in Fig. 2. Thus violent jerks or jars in starting the cars are obviated or lessened.

By my invention I protect the hose or pipe couplings of the brakes, and prevent their being injured; and as the hose or pipes are coupled automatically by the coupling of the cars, a saving of time is effected, and no accidents can happen from a neglect to couple the hose or pipes of the brakes.

What I claim as my invention, and desire to secure by Letters Patent, is—

1. The combination of two draw-bars adapted to fit one within the other, two pipes arranged concentrically within said draw-bars, and two yielding terminals for said pipes adapted to be brought in end-to-end contact in coupling and having one a concave and the other a convex face, substantially as specified.

2. The combination, with the hollow draw-bar A, of the hose or pipe C, arranged therein and stationary relatively thereto, and having its end closed and holes $j$ in the side, and the yielding terminal C', provided with a chamber, D, fitting outside the pipe C, and comprising a contracted cylindric portion tightly fitting said pipe and adapted by its longitudinal movement to open and close the holes $j$, substantially as specified.

3. The combination of the draw-bar A and concentrically-arranged pipes C C', the draw-bar F, having a circumferential groove or notch, $h$, extending partly around it, and the concentrically-arranged pipe $C^2$, and the dog G, pivoted to the draw-bar A, and having a segmental lip or projection for engaging with the groove or notch $h$, substantially as specified.

4. The hollow cylindrical draw-bar composed of the section A, having the externally-polygonal socket $m$ and the polygonal end $n$, of the section B', comprising the internally-polygonal bands or sockets $k\ k'$, for preventing the turning of the sections relatively to each other, in combination with the hose or pipe C, extending through the section A, substantially as specified.

5. The combination of the hollow draw-bar A and concentrically-arranged pipes C C', the draw-bar F, adapted to fit within the draw-bar A and having a concentrically-arranged pipe C², the dog G, and the latch G', all substantially as specified.

6. The combination, with the section B' of the draw-bar, comprising the bands or sockets k k', united by plates or bars l, of the hollow section A, the washers p p', impinging against the bands or sockets k k', the spring H, arranged between said washers, and the hose or pipe C, arranged within the section A, substantially as specified.

WILLIAM N. HARING.

Witnesses:
CHANDLER HALL,
THOMAS E. BIRCH.